(12) United States Patent
Wang et al.

(10) Patent No.: US 8,446,866 B2
(45) Date of Patent: May 21, 2013

(54) BASE STATION APPARATUS AND WIRELESS RESOURCE ALLOCATION METHOD

(75) Inventors: Xiaoqiu Wang, Fujimino (JP); Satoshi Konishi, Fujimino (JP)

(73) Assignee: KDDI Corporation, Tokyo (JP)

( * ) Notice: Subject to any disclaimer, the term of this patent is extended or adjusted under 35 U.S.C. 154(b) by 609 days.

(21) Appl. No.: 12/707,272

(22) Filed: Feb. 17, 2010

(65) Prior Publication Data

US 2010/0215008 A1    Aug. 26, 2010

(30) Foreign Application Priority Data

Feb. 26, 2009  (JP) ............................... P2009-043902

(51) Int. Cl.
 *H04W 4/00* (2009.01)
(52) U.S. Cl.
 USPC .......................................................... 370/329
(58) Field of Classification Search
 USPC ................. 370/329, 341, 348; 455/450, 464, 455/509; 709/226, 232–234; 710/36, 105, 710/106, 117
 See application file for complete search history.

(56) References Cited

U.S. PATENT DOCUMENTS

| | | | |
|---|---|---|---|
| 2004/0062267 A1* | 4/2004 | Minami et al. | 370/463 |
| 2005/0270975 A1 | 12/2005 | Meylan et al. | |
| 2008/0049640 A1* | 2/2008 | Heinz et al. | 370/252 |

FOREIGN PATENT DOCUMENTS

| | | |
|---|---|---|
| JP | 2004-187237 A | 7/2004 |
| JP | 2008-502211 A | 1/2008 |

OTHER PUBLICATIONS

Office Action for Japanese Patent Application No. 2009-043902—Issued on Oct. 30, 2012 including English Translation of Notice of Reasons for Rejection.

* cited by examiner

*Primary Examiner* — Mark Rinehart
*Assistant Examiner* — Mang Yeung
(74) *Attorney, Agent, or Firm* — Morgan, Lewis & Bockius LLP

(57) ABSTRACT

A base station apparatus in a wireless communication network system includes an information obtaining unit that obtains a delay request value for application data which is transmitted and received between a terminal and a communication partner thereof through an application layer, where the terminal performs data transmission and reception by wirelessly accessing the base station apparatus; and a resource allocator that computes, based on the delay request value for the application data, a residual time up to a time by which an application data transmitting side, which is one of the base station apparatus and the terminal, should complete wireless transmission of TCP packets which store the application data, and performs wireless resource allocation of a wireless resource used in wireless communication between the base station apparatus and the terminal, based on a degree of margin of the residual time for a prearranged transmission time of the wireless transmission from the application data transmitting side.

12 Claims, 3 Drawing Sheets

BASE STATION APPARATUS AND WIRELESS RESOURCE ALLOCATION METHOD

BACKGROUND OF THE INVENTION

1. Field of the Invention

The present invention relates to a base station apparatus and wireless resource allocation method for a wireless communication network system.

Priority is claimed on Japanese Patent Application No. 2009-043902, filed Feb. 26, 2009, the contents of which are incorporated herein by reference.

2. Description of the Related Art

Patent Document 1 discloses a known technique used in a base station apparatus of a wireless communication network system, so as to perform allocation of a wireless resource used in wireless communication with a terminal which accesses the base station apparatus and performs data transmission and reception.

Patent Document 1: Published Japanese Translation, No. 2008-502211, of PCT International Publication, No. WO2005/122506

However, in the above conventional technique, a delay request for application data which is transmitted and received through an application layer between a terminal and a communication partner thereof cannot be applied to the wireless resource allocation. Therefore, it is difficult to satisfy a user's demand for solving a processing delay in a best-effort service (e.g. Web accessing, downloading of a musical piece or video file, net auction, etc.) which uses a TCP (transmission control protocol) for an application layer and targets wireless terminals such as cellular phones or the like.

SUMMARY OF THE INVENTION

In light of the above circumstances, an object of the present invention is to provide a base station apparatus and wireless resource allocation method, by which a delay request for an application using TCP can be applied to the wireless resource allocation.

Therefore, the present invention provides a base station apparatus in a wireless communication network system, the apparatus comprising:

an information obtaining unit that obtains a delay request value for application data which is transmitted and received between a terminal and a communication partner thereof through an application layer, where the terminal performs data transmission and reception by wirelessly accessing the base station apparatus; and a resource allocator that:

computes, based on the delay request value for the application data, a residual time up to a time by which an application data transmitting side, which is one of the base station apparatus and the terminal, should complete wireless transmission of TCP packets which store the application data, and performs allocation of a wireless resource used in wireless communication between the base station apparatus and the terminal, based on a degree of margin of the residual time for a prearranged transmission time of the wireless transmission from the application data transmitting side.

In the base station apparatus, it is possible that:

the information obtaining unit has a device for obtaining a TCP window size for transmission and reception of the application data and a time when the TCP window size is updated; and the resource allocator computes the degree of margin of the residual time for unit data corresponding to the TCP window size.

In such a case, it is possible that:

the information obtaining unit has a device for obtaining a delay request value for one TCP packet, which is computed based on an assumption that the delay request value for the application data is equally distributed into the TCP packets; and the resource allocator has a device for computing, based on the delay request value for one TCP packet, a delivery confirmation completion residual time that represents a residual time up to a time by which delivery confirmation for all TCP packets which can be stored in an area of the TCP window size should be completed between the terminal and the communication partner.

In this case, it is possible that:

the information obtaining unit has a device for obtaining an estimated response time which represents an estimated time required from when an application data receiving side, which is one of the terminal and the communication partner, transmits a delivery confirmation signal for the TCP packets to when the delivery confirmation signal reaches the application data transmitting side; and the resource allocator has a transmission delay request value computation device for computing a transmission delay request value by subtracting the estimated response time from the delivery confirmation completion residual time, where the transmission delay request value represents a residual time up to a time by which the application data transmitting side should complete the wireless transmission of all TCP packets which can be stored in an area of the TCP window size.

In this case, it is possible that:

the information obtaining unit has a device for obtaining a specific time defined for a delay confirmation response timer provided at the application data receiving side; and the transmission delay request value computation device computes the transmission delay request value by subtracting the estimated response time and the specific time for the delay confirmation response timer from the delivery confirmation completion residual time.

In a preferable example, the information obtaining unit has a device for obtaining an actual measured TCP throughput value for the application data; and the resource allocator has:

a device for computing a TCP throughput request value by dividing a total amount of the application data, which is stored in all TCP packets which can be stored in an area of the TCP window size, by a total amount of the delay request value for one TCP packet for said all TCP packets which can be stored in an area of the TCP window size;

a device for computing a priority of the application data based on the degree of margin of the residual time for the prearranged transmission time of the wireless transmission from the application data transmitting side, and on a degree of closeness of the actual measured TCP throughput value to the TCP throughput request value; and a device for performs the allocation of the wireless resource based on the priority of the application data.

The present invention also provides a method that is used in a base station apparatus in a wireless communication network system and allocates a wireless resource used in wireless communication with a terminal which performs data transmission and reception by wirelessly accessing the base station apparatus, the method comprising:

a step that obtains a delay request value for application data which is transmitted and received between a terminal and a communication partner thereof through an application layer;

a step that computes, based on the delay request value for the application data, a residual time up to a time by which an application data transmitting side, which is one of the base station apparatus and the terminal, should complete wireless transmission of TCP packets which store the application data, and a wireless resource allocation step that performs allocation of a wireless resource used in wireless communication between the base station apparatus and the terminal, based on a degree of margin of the residual time for a prearranged transmission time of the wireless transmission from the application data transmitting side.

The method may further comprise:

a step that obtains a TCP window size for transmission and reception of the application data and a time when the TCP window size is updated; and a step that computes the degree of margin of the residual time for unit data corresponding to the TCP window size.

In such a case, the method may further comprise:

a step that obtains a delay request value for one TCP packet, which is computed based on an assumption that the delay request value for the application data is equally distributed into the TCP packets; and a step that computes, based on the delay request value for one TCP packet, a delivery confirmation completion residual time that represents a residual time up to a time by which delivery confirmation for all TCP packets which can be stored in an area of the TCP window size should be completed between the terminal and the communication partner.

In this case, the method may further comprise:

a step that obtains an estimated response time which represents an estimated time required from when an application data receiving side, which is one of the terminal and the communication partner, transmits a delivery confirmation signal for the TCP packets to when the delivery confirmation signal reaches the application data transmitting side; and a transmission delay request value computation step that computes a transmission delay request value by subtracting the estimated response time from the delivery confirmation completion residual time, where the transmission delay request value represents a residual time up to a time by which the application data transmitting side should complete the wireless transmission of all TCP packets which can be stored in an area of the TCP window size.

In this case, the method may further comprise:

a step that obtains a specific time defined for a delay confirmation response timer provided at the application data receiving side, wherein the transmission delay request value computation step computes the transmission delay request value by subtracting the estimated response time and the specific time for the delay confirmation response timer from the delivery confirmation completion residual time.

In a preferable example, the method may further comprise:

a step that obtains an actual measured TCP throughput value for the application data;

a step that computes a TCP throughput request value by dividing a total amount of the application data, which is stored in all TCP packets which can be stored in an area of the TCP window size, by a total amount of the delay request value for one TCP packet for said all TCP packets which can be stored in an area of the TCP window size; and a step that computes a priority of the application data based on the degree of margin of the residual time for the prearranged transmission time of the wireless transmission from the application data transmitting side, and on a degree of closeness of the actual measured TCP throughput value to the TCP throughput request value, wherein the wireless resource allocation step performs the allocation of the wireless resource based on the priority of the application data.

In accordance with the present invention, a delay request for an application using TCP can be applied to the wireless resource allocation.

DETAILED DESCRIPTION OF THE INVENTION

Hereinafter, embodiments of the present invention will be described with reference to the appended figures.

Figure 1:
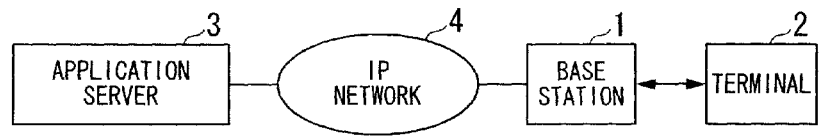
FIG. 1 is a schematic view showing the general structure of a wireless communication network system as an embodiment of the present invention.

FIG. 1 is a schematic view showing the general structure of a wireless communication network system as an embodiment of the present invention.

In FIG. 1, the wireless communication network system has a base station apparatus 1 (simply called a "base station") and a terminal 2 which wirelessly accesses the base station 1 and performs data transmission and reception with the base station 1. The base station 1 is connected with an IP network 4 which performs IP (Internet protocol) packet transfer.

An application server 3 provides a service using a TCP (simply called an "application") through an application layer. TCP packets which store data used in the application (called "application data") is transmitted and received between the application server 3 and the terminal 2. The application server 3 is a partner of the terminal 2 in the communication through the application layer. The TCP packets are IP packets in which TCP is used in a transport layer.

Below, the base station 1 will be explained in a practical embodiment 1 for transmitting the application data from the application server 3 to the terminal 2, and a practical embodiment 2 for transmitting the application data from the terminal 2 to the application server 3.

Practical Embodiment 1

Figure 2:
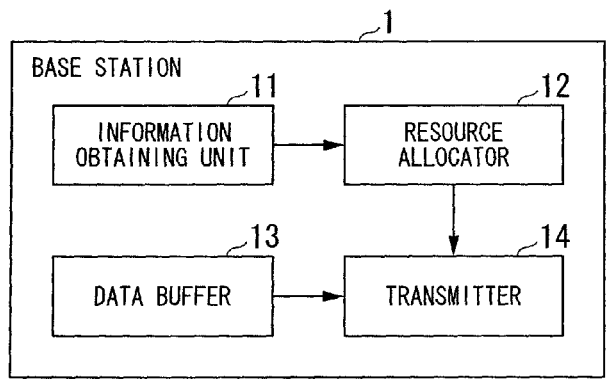
FIG. 2 is a block diagram showing a first example of the base station in the embodiment.

In this embodiment, the application data is transmitted from the application server 3 to the terminal 2. FIG. 2 shows a first example of the base station 1 for the present embodiment, and shows the general structure relating to downstream transmission (i.e., from the base station 1 to the terminal 2). In FIG. 2, the base station 1 has an information obtaining unit 11, a resource allocator 12, a data buffer 13, and a transmitter 14.

The information obtaining unit 11 obtains information used in wireless resource allocation.

The resource allocator 12 performs allocation of a wireless resource used in download wireless communication by using the information obtained by the information obtaining unit 11.

The data buffer 13 temporarily stores each IP packet received via the IP network 4.

Each TCP packets transmitted from the application server 2 to the terminal 2 reaches the base station 1 via the IP network 4, and is stored in the application server 3.

In accordance with results of the wireless resource allocation performed by the resource allocator 12, the transmitter 14 reads targets IP packets (for transmission) from the data buffer 13, and wirelessly transmits the IP packets using an allocated resource.

Figure 3:
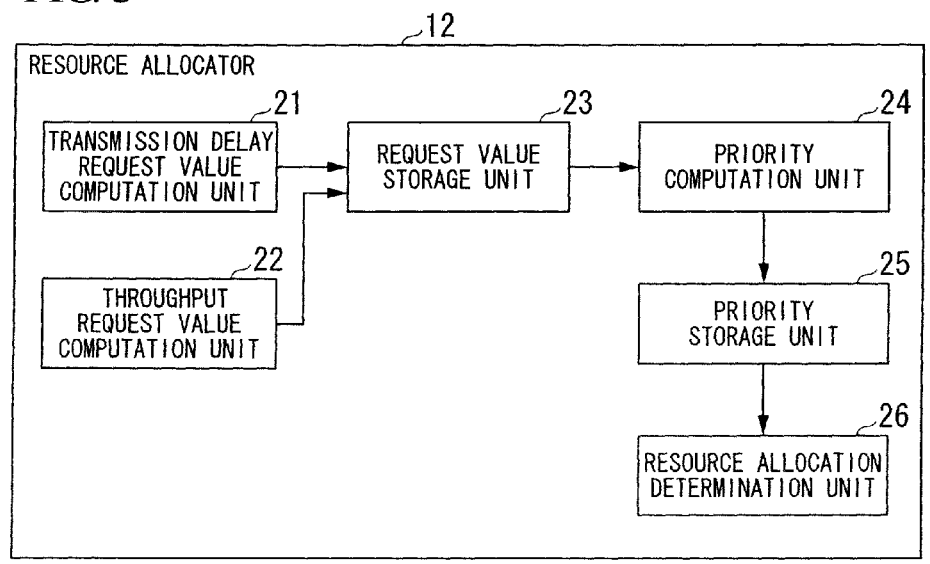
FIG. 3 is a block diagram showing the structure of the resource allocator in the embodiment.

FIG. 3 is a block diagram showing the structure of the resource allocator 12 in FIG. 2. In FIG. 3, the resource allocator 12 has a transmission delay request value computation unit 21, a throughput request value computation unit 22, a request value storage unit 23, a priority computation unit 24, a priority storage unit 25, and a resource allocation determination unit 26.

The transmission delay request value computation unit 21 computes a transmission delay request value (P) for TCP packets which store the application data transmitted from the application server 3 to the terminal 2. The transmission delay request value (P) represents the remaining time until the base station 1 should complete the wireless communication of all TCP packets which can be stored in an area of a TCP window size "cwnd". Below, the method of computing the transmission delay request value (P) will be explained in detail.

First, the transmission delay request value computation unit 21 receives a delay request value (Y) for one TCP packet (i.e., for each TCP packet), from the information obtaining unit 11.

Here, the method of computing the delay request value (Y) for one TCP packet will be explained. The information obtaining unit 11 receives a delay request value (X) for the application data (transmitted and received between the terminal 2 and the application server 3), from the terminal 2. The information obtaining unit 11 then computes the delay request value (Y) for one TCP packet by assuming that the above delay request value for the application data is equally distributed into the TCP packets which store the application data.

The delay request value (Y) is computed by the following formula:

$$Y = \text{ceil}(X/N)$$

where "ceil (x)" indicates an integer which is greater than or equal to x and closest to x, and N indicates the total number of the TCP packets which store the application data.

N can be obtained by dividing the size of the application data by the size (predetermined value) of the TCP packet.

The information obtaining unit 11 receives the size of the application data from the terminal 2, where the size is communicated from the application server 3 to terminal 2 in a preparation stage for the transmission of the application data from the application server 3 to the terminal 2.

The information obtaining unit 11 may obtain the delay request value (Y) for one TCP packet from the terminal 2.

The transmission delay request value computation unit 21 receives from the information obtaining unit 11, the TCP window size "cwnd" and the time for updating cwnd for the transmission and reception of the application data. The information obtaining unit 11 receives from the terminal 2, the TCP window size "cwnd" and the time for updating cwnd for the transmission and reception of the application data.

The base station 1 may have a device for estimating the TCP window size "cwnd" and the time for updating cwnd for the transmission and reception of the application data, and the information obtaining unit 11 may receive the estimated values from the device.

The transmission delay request value computation unit 21 also receives an estimated response time (predetermined value Q) from the information obtaining unit 11. The estimated response time (Q) represents the estimated time required from when the terminal 2 transmits a TCP packet delivery confirmation signal (i.e., a confirmation signal for the TCP packet delivery) to when the confirmation signal reaches the application server 3.

The base station 1 may also have a device for evaluating the estimated response time (Q), and the information obtaining unit 11 may obtain the evaluated value.

The transmission delay request value computation unit 21 also receives from the information obtaining unit 11, a specific time for a delay confirmation response timer of the terminal 2. The delay confirmation response timer is a timer used for measuring a time period (i.e., specific time) during which the TCP packet receiving side can hold transmitting a confirmation response signal (ACK) as the TCP packet delivery confirmation signal. When the specific time has elapsed, the TCP packet receiving side must immediately transmits the confirmation response signal (ACK) as a reply signal. The information obtaining unit 11 receives the specific time of the delay confirmation response timer from the terminal 2.

Next, the transmission delay request value computation unit 21 multiplies the delay request value (Y) for one TCP packet by the total number of the TCP packets which can be stored in an area of the TCP window size "cwnd", so as to compute a delivery confirmation completion residual time (Z). The total number of the TCP packets which can be stored in an area of the TCP window size cwnd can be obtained by dividing the TCP window size cwnd by the size (predetermined value) of each TCP packet. The delivery confirmation completion residual time (Z) represents a residual time up to a time by which the delivery confirmation for all TCP packets which can be stored in an area of the TCP window size "cwnd" should be completed between the terminal 2 and the application server 3. Specifically, the delivery confirmation completion residual time (Z) is computed as follows:

$$Z = \text{"total number of the TCP packets which can be stored in an area of the TCP window size cwnd"} \times \text{"delay request value } (Y) \text{ for one TCP packet"}$$

Next, the transmission delay request value computation unit 21 subtracts the estimated response time (Q) and the above-described specific time of the delay confirmation response timer from the delivery confirmation completion residual time (Z), so as to compute the above-described transmission delay request value (P). The transmission delay request value (P) represents a residual time up to a time by which the base station should complete the wireless transmission of all TCP packets which can be stored in an area of the TCP window size cwnd. Specifically, the transmission delay request value (P) is computed as follows:

$$P = Z - Q - \text{"specific time of the delay confirmation response timer"}$$

The method of computing the transmission delay request value (P) has been explained above.

The transmission delay request value computation unit 21 stores the transmission delay request value (P) into the request value storage unit 23. The transmission delay request value computation unit 21 updates the transmission delay request value (P) in accordance with the time when the TCP window size cwnd is updated.

The throughput request value computation unit 22 computes a TCP throughput request value by dividing the total amount of application data stored in all TCP packets (which can be stored in an area of the TCP window size cwnd) by the total amount of the delay request value (Y) for each TCP packet. Here, it is assumed that the size (predetermined value) of the TCP packet is fixed. Therefore, the TCP throughput request value may be computed by dividing the size (predetermined value) of the TCP packet by the delay request value (Y) for one TCP packet. The throughput request value computation unit 22 stores the TCP throughput request value into the request value storage unit 23.

The request value storage unit 23 stores the transmission delay request value (P) and the TCP throughput request value for each application data item for the terminal 2.

The priority computation unit 24 computes a priority for each application data item of the terminal 2. The method of computing the priority will be explained in detail below.

The priority computation unit 24 receives from the information obtaining unit 11, an actual measured TCP throughput value for each application data item of the terminal 2. The information obtaining unit 11 receives from the terminal 2, the actual measured TCP throughput value for each application data item of the terminal 2, and transfers the received value to the priority computation unit 24. The actual measured TCP throughput value can be obtained by dividing the size of the TCP packets which have been delivered, by a time (period) which was required for delivering the TCP packets.

The priority computation unit 24 computes the priority based on (i) a delay margin degree which indicates a degree of margin for the transmission delay request value (P) with respect to a residual time up to a prearranged transmission time for the wireless communication by the base station 1, and (ii) a comparison between the actual measured TCP throughput value and the TCP throughput request value. More specifically, the delay margin degree is computed by the following formula:

delay margin degree="residual time up to the prearranged transmission time"−"transmission delay request value (P)"

The priority is computed by the following formula:

priority=$f$(delay margin degree)×$g$("actual measured TCP throughput value"/"the TCP throughput request value")

where f(x) is a specific function using x as an argument, and g(y) is a specific function using y as an argument. Specific examples of f(x) and g(y) are as follows:

$f(x)=\exp(-x)$ $g(y)=\exp(-y)$

Accordingly, the lower the delay margin degree, the higher the priority. In addition, the smaller the actual measured TCP throughput value for the TCP throughput request value, the higher the priority.

The method of computing the priority has been explained above.

The priority computation unit 24 stores the priority into the priority storage unit 25. The priority computation unit 24 updates the priority in accordance with the timing for the wireless resource allocation.

In addition, the priority computation unit 24 stores the priority for each application data item of the terminal 2.

Based on the priority for each application data item of the terminal 2, the resource allocation determination unit 26 performs allocation of the wireless resource used in the wireless communication between the base station 1 and the terminal 2. The resource allocation determination unit 26 communicates the result of the wireless resource allocation to the transmitter 14.

Figure 4:
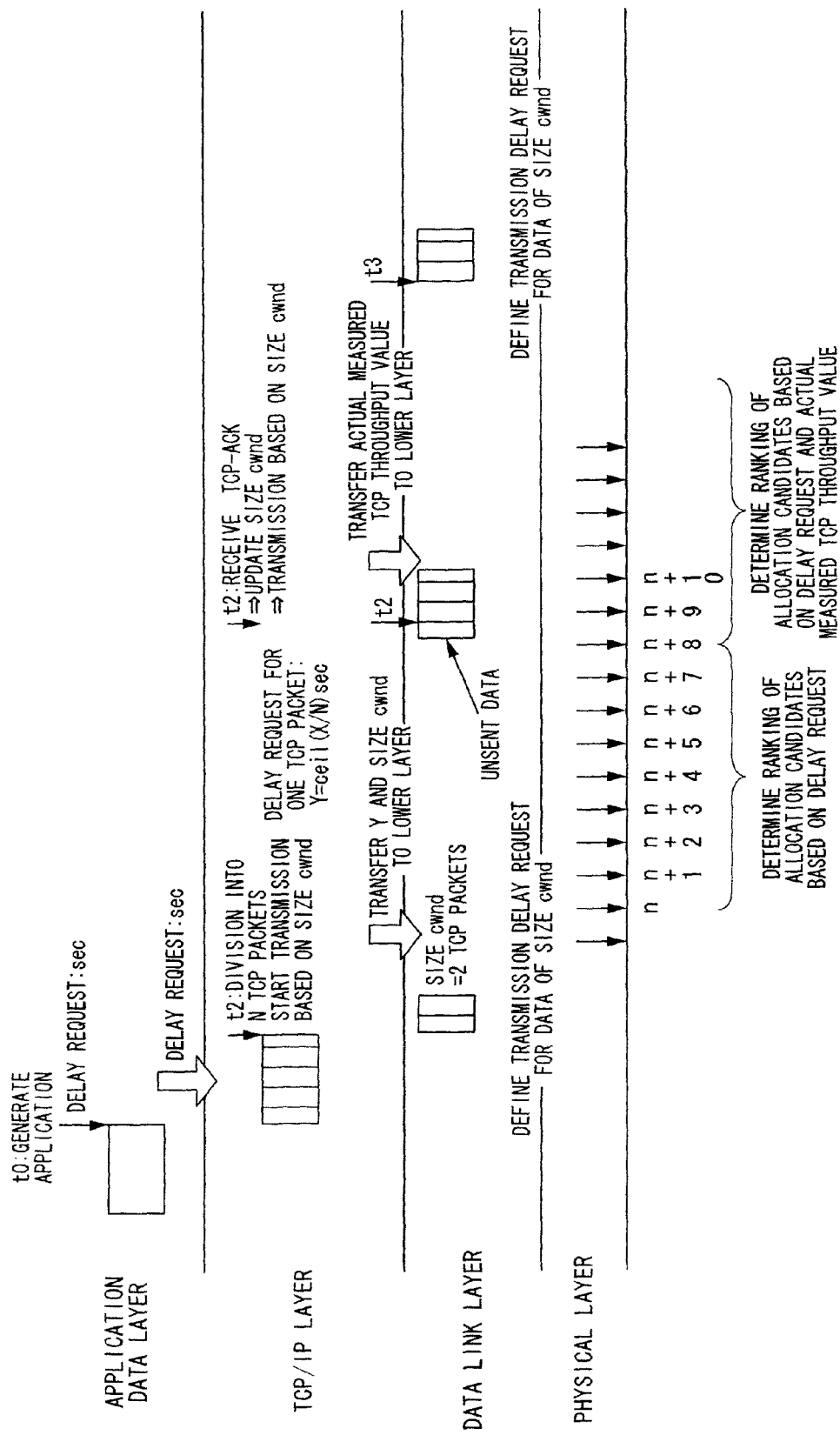
FIG. 4 is a schematic diagram showing the procedure of the wireless resource allocation in the embodiment.

FIG. 4 is a schematic diagram showing the procedure of the wireless resource allocation in the present embodiment. FIG. 4 is illustrated in correspondence to a layered structure of a communication protocol using TCP/IP. The terminal 2 and the application server 3 each have layers from a physical layer to an application layer. The base station 1 has layers from the physical layer to a data link layer.

In FIG. 4, at time t0, the delay request value (X) for the relevant application data is transferred from the application layer to the TCP/IP layer.

At time t1, in the TCP/IP layer, the application data is divided so that it is stored into N TCP packets, and transmission of the TCP packets (which have stored the application data) is started in accordance with the TCP window size "cwnd". The delay request value (Y) for one TCP packet and the TCP window size cwnd are transferred from the TCP/IP layer to the data link layer. In the example shown in FIG. 4, two TCP packets can be stored in an area of the TCP window size cwnd.

In the data link layer, the transmission delay request value (P) for the data corresponding to the TCP window size cwnd is defined (i.e., computed). Based on the transmission delay request value (P), the ranking of candidates for the target (terminal) to which the wireless resource is allocated is determined. In accordance with the ranking, the wireless resource allocation is executed.

In the physical layer, the TCP packet wireless transmission is performed in accordance with the wireless resource allocation.

At time t2, the TCP/IP layer receives the confirmation response signal (ACK) for the TCP packets, and the TCP window size cwnd is updated. In accordance with the updated TCP window size cwnd, transmission of the TCP packets which store the application data is performed. The TCP/IP layer then transmits the actual measured TCP throughput value to the data link layer. Accordingly, in the data link layer, the ranking of candidates for the target to which the wireless resource is allocated is determined based on the transmission delay request value (P) and the actual measured TCP throughput value.

At time t3, the transmission delay request value (P) is defined (i.e., computed) based on the updated TCP window size cwnd.

Practical Embodiment 2

Figure 5:
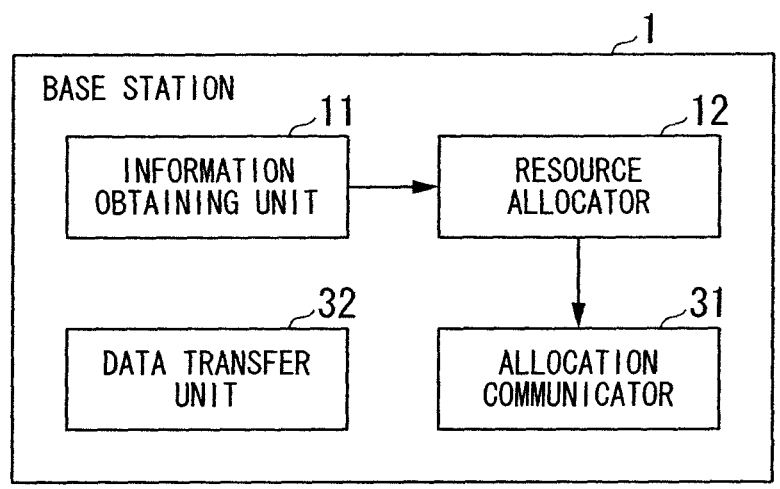
FIG. 5 is a block diagram showing a second example of the base station in the embodiment.

In this embodiment, the application data is transmitted from the terminal 2 to the application server 3. FIG. 5 shows a second example of the base station 1 for the present embodiment, and shows the general structure relating to upstream transmission (i.e., from the terminal 2 to the base station 1). In FIG. 5, the base station 1 has an information obtaining unit 11, a resource allocator 12, an allocation communicator 31, and a data transfer unit 32. The information obtaining unit 11 and the resource allocator 12 correspond to those of Practical Embodiment 1 shown in FIG. 2. Below, the distinctive features of Practical Embodiment 2 in comparison with Practical Embodiment 1 will be mainly explained.

The allocation communicator 31 informs the terminal 2 of the result of the wireless resource allocation by the resource allocator 12. In accordance with the result of the wireless resource allocation, the terminal 2 performs wireless communication of the TCP packets which store the relevant application data, by using an allocated wireless resource.

The data transfer unit 32 transfers the TCP packets received from the terminal 2, to the application server 3.

The resource allocator 12 has a structure similar to that (in Practical Embodiment 1) shown in FIG. 3. However, the distinctive features thereof in comparison with Practical Embodiment 1 will be explained below with reference to FIG. 3.

The transmission delay request value computation unit 21 computes the transmission delay request value (P) for TCP packets which store the application data transmitted from the terminal 2 to the application server 3. The transmission delay request value (P) represents a remaining time until the terminal 2 should complete the wireless communication of all TCP packets which can be stored in an area of the TCP window size "cwnd". The transmission delay request value (P) is computed by a method similar to that explained in Practical Embodiment 1.

The information obtaining unit 11 obtains the size of the application data from the terminal 2. For the specific time of the delay confirmation response timer, that defined for the application server 3 is used.

The transmission delay request value computation unit 21 stores the transmission delay request value (P) into the request value storage unit 23. The transmission delay request value computation unit 21 updates the transmission delay request value (P) in accordance with the time when the TCP window size cwnd is updated.

The throughput request value computation unit 22 computes the TCP throughput request value by using a method similar to that explained in Practical Embodiment 1. The throughput request value computation unit 22 stores the TCP throughput request value into the request value storage unit 23.

The request value storage unit 23 stores the transmission delay request value (P) and the TCP throughput request value for each application data item for the terminal 2.

The priority computation unit 24 computes a priority for each application data item of the terminal 2, based on (i) a delay margin degree which indicates a degree of margin for the transmission delay request value (P) with respect to a residual time up to a prearranged transmission time for the wireless communication by the terminal 2, and (ii) a comparison between the actual measured TCP throughput value and the TCP throughput request value. The priority is computed by a method similar to that explained in Practical Embodiment 1.

The priority computation unit 24 stores the priority into the priority storage unit 25. The priority computation unit 24 updates the priority in accordance with the timing for the wireless resource allocation. In addition, the priority computation unit 24 stores the priority for each application data item of the terminal 2.

Based on the priority for each application data item of the terminal 2, the resource allocation determination unit 26 performs allocation of the wireless resource used in the wireless communication between the base station 1 and the terminal 2. The resource allocation determination unit 26 communicates the result of the wireless resource allocation to the allocation communicator 31.

As described above, in accordance with the present embodiment, the delay request value (X) for application data of an application using TCP is considered in determination of the ranking of candidates for the target to which the wireless resource is allocated. Therefore, it is possible to contribute to sufficiently satisfying a user's demand for solving a processing delay in a best-effort service (e.g., Web accessing, downloading of a musical piece or video file, net auction, etc.) which uses a TCP for an application layer and targets wireless terminals such as cellular phones or the like.

While preferred embodiments of the present invention have been described and illustrated above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A base station apparatus in a wireless communication network system, the apparatus comprising:
   an information obtaining unit that obtains a delay request value for application data which is transmitted and received between a terminal and a communication partner thereof through an application layer, where the terminal performs data transmission and reception by wirelessly accessing the base station apparatus; and
   a resource allocator that:
   computes, based on the delay request value for the application data, a residual time up to a time by which an application data transmitting side, which is one of the base station apparatus and the terminal, should complete wireless transmission of TCP packets which store the application data, and
   performs allocation of a wireless resource used in wireless communication between the base station apparatus and the terminal, based on a degree of margin of the residual time for a prearranged transmission time of the wireless transmission from the application data transmitting side.

2. The base station apparatus in accordance with claim 1, wherein:
   the information obtaining unit has a device for obtaining a TCP window size for transmission and reception of the application data and a time when the TCP window size is updated; and
   the resource allocator computes the degree of margin of the residual time for unit data corresponding to the TCP window size.

3. The base station apparatus in accordance with claim 2, wherein:
   the information obtaining unit has a device for obtaining a delay request value for one TCP packet, which is computed based on an assumption that the delay request value for the application data is equally distributed into the TCP packets; and
   the resource allocator has a device for computing, based on the delay request value for one TCP packet, a delivery confirmation completion residual time that represents a residual time up to a time by which delivery confirmation for all TCP packets which can be stored in an area of the TCP window size should be completed between the terminal and the communication partner.

4. The base station apparatus in accordance with claim 3, wherein:
   the information obtaining unit has a device for obtaining an estimated response time which represents an estimated time required from when an application data receiving side, which is one of the terminal and the communication partner, transmits a delivery confirmation signal for the TCP packets to when the delivery confirmation signal reaches the application data transmitting side; and
   the resource allocator has a transmission delay request value computation device for computing a transmission delay request value by subtracting the estimated response time from the delivery confirmation completion residual time, where the transmission delay request value represents a residual time up to a time by which the application data transmitting side should complete the wireless transmission of all TCP packets which can be stored in an area of the TCP window size.

5. The base station apparatus in accordance with claim 4, wherein:
the information obtaining unit has a device for obtaining a specific time defined for a delay confirmation response timer provided at the application data receiving side; and
the transmission delay request value computation device computes the transmission delay request value by subtracting the estimated response time and the specific time for the delay confirmation response timer from the delivery confirmation completion residual time.

6. The base station apparatus in accordance with claim 1, wherein:
the information obtaining unit has a device for obtaining an actual measured TCP throughput value for the application data; and
the resource allocator has:
a device for computing a TCP throughput request value by dividing a total amount of the application data, which is stored in all TCP packets which can be stored in an area of the TCP window size, by a total amount of the delay request value for one TCP packet for said all TCP packets which can be stored in an area of the TCP window size;
a device for computing a priority of the application data based on the degree of margin of the residual time for the prearranged transmission time of the wireless transmission from the application data transmitting side, and on a degree of closeness of the actual measured TCP throughput value to the TCP throughput request value; and
a device for performs the allocation of the wireless resource based on the priority of the application data.

7. A method that is used in a base station apparatus in a wireless communication network system and allocates a wireless resource used in wireless communication with a terminal which performs data transmission and reception by wirelessly accessing the base station apparatus, the method comprising:
a step that obtains a delay request value for application data which is transmitted and received between a terminal and a communication partner thereof through an application layer;
a step that computes, based on the delay request value for the application data, a residual time up to a time by which an application data transmitting side, which is one of the base station apparatus and the terminal, should complete wireless transmission of TCP packets which store the application data, and
a wireless resource allocation step that performs allocation of a wireless resource used in wireless communication between the base station apparatus and the terminal, based on a degree of margin of the residual time for a prearranged transmission time of the wireless transmission from the application data transmitting side.

8. The method in accordance with claim 7, further comprising:
a step that obtains a TCP window size for transmission and reception of the application data and a time when the TCP window size is updated; and
a step that computes the degree of margin of the residual time for unit data corresponding to the TCP window size.

9. The method in accordance with claim 8, further comprising:
a step that obtains a delay request value for one TCP packet, which is computed based on an assumption that the delay request value for the application data is equally distributed into the TCP packets; and a step that computes, based on the delay request value for one TCP packet, a delivery confirmation completion residual time that represents a residual time up to a time by which delivery confirmation for all TCP packets which can be stored in an area of the TCP window size should be completed between the terminal and the communication partner.

10. The method in accordance with claim 9, further comprising:
a step that obtains an estimated response time which represents an estimated time required from when an application data receiving side, which is one of the terminal and the communication partner, transmits a delivery confirmation signal for the TCP packets to when the delivery confirmation signal reaches the application data transmitting side; and
a transmission delay request value computation step that computes a transmission delay request value by subtracting the estimated response time from the delivery confirmation completion residual time, where the transmission delay request value represents a residual time up to a time by which the application data transmitting side should complete the wireless transmission of all TCP packets which can be stored in an area of the TCP window size.

11. The method in accordance with claim 10, further comprising:
a step that obtains a specific time defined for a delay confirmation response timer provided at the application data receiving side,
wherein the transmission delay request value computation step computes the transmission delay request value by subtracting the estimated response time and the specific time for the delay confirmation response timer from the delivery confirmation completion residual time.

12. The method in accordance with claim 7, further comprising:
a step that obtains an actual measured TCP throughput value for the application data;
a step that computes a TCP throughput request value by dividing a total amount of the application data, which is stored in all TCP packets which can be stored in an area of the TCP window size, by a total amount of the delay request value for one TCP packet for said all TCP packets which can be stored in an area of the TCP window size; and
a step that computes a priority of the application data based on the degree of margin of the residual time for the prearranged transmission time of the wireless transmission from the application data transmitting side, and on a degree of closeness of the actual measured TCP throughput value to the TCP throughput request value,
wherein the wireless resource allocation step performs the allocation of the wireless resource based on the priority of the application data.

* * * * *